United States Patent [19]

Lyon, Jr.

[11] 3,787,058

[45] Jan. 22, 1974

[54] MAGNETIC TAPE REPRODUCING DEVICE

[75] Inventor: Charles E. Lyon, Jr., Des Plaines, Ill.

[73] Assignee: Motorola, Inc., Franklin Park, Ill.

[22] Filed: Nov. 10, 1971

[21] Appl. No.: 197,507

Related U.S. Application Data

[63] Continuation of Ser. No. 487,996, Sept. 17, 1965, abandoned.

[52] U.S. Cl. . 274/4 G, 179/100.2 Z, 179/100.2 CA
[51] Int. Cl. ........................ G11b 21/08, G11b 23/04
[58] Field of Search .........274/4 G; 179/100.2 CA, 179/100.2 Z; 242/55.19 A

[56] References Cited

UNITED STATES PATENTS

| | | | |
|---|---|---|---|
| 3,420,965 | 1/1969 | Townsend et al. | 179/100.2 CA |
| 3,370,131 | 2/1968 | Reed | 179/100.2 CA |
| 3,350,025 | 10/1967 | Lear | 242/55.19 A |

*Primary Examiner*—Bernard Konick
*Assistant Examiner*—David Moore
*Attorney, Agent, or Firm*—Mueller, Aichele & Gillman

[57] ABSTRACT

This invention pertains to cartridge tape players and more particularly to the automatic positioning of the magnetic tape head of a cartridge type tape player that is adapted to receive and play multi-track tape cartridges of different kinds which have tapes with different numbers of tracks. Automatic operation means also include a cartridge sensing means for identifying four track and eight track cartridges and a head actuating means including a pair of coaxially mounted cams for shifting said magnetic head according to the type of cartridge sensed.

17 Claims, 9 Drawing Figures

INVENTOR
CHARLES E. LYON JR.
BY Mueller, Aichele & Rauner
ATTORNEYS

INVENTOR
CHARLES E. LYON JR.

BY Mueller Aichele & Rauner
ATTORNEYS

INVENTOR
CHARLES E. LYON JR.
BY Mueller, Aichele & Rauner
ATTORNEYS

MAGNETIC TAPE REPRODUCING DEVICE

This is a continuation, of application Ser. No. 487,996, filed Sept. 17, 1965, now abandoned.

Both four and eight track tape cartridges are currently available for stereophonic cartridge-type tape players. It is possible that other multiples of tape tracks for cartridge type players may be developed in the future. Because of the various kinds of cartridges available, the need for a versatile cartridge-type tape player that has the capability of playing all of the different cartridges is apparent.

It has been proposed that cartridge-type tape players be provided in combination with a radio for use in automobiles. However, until now these radio tape player units have not had the capability of playing different multi-track tape cartridges. In addition the operating mechanism of the proposed players has been complicated resulting in objectionably large units which have been relatively expensive to manufacture.

An object of this invention is to provide an automatic positioning structure for a magnetic tape head of a cartridge-type tape player that is adapted to receive and play multi-track cartridges of different kinds which have tapes with different numbers of tracks.

Another object of this invention is to provide an automatic positioning structure for the magnetic tape head of a cartridge-type tape player that is relatively simple and inexpensive to manufacture.

Still another object of this invention is to provide a combined radio and tape player for installation into an auto mobile which includes a compact and rugged versatile cartridge-type player capable of playing different kinds of multi-track tape cartridges.

One feature of this invention is a system for automatically positioning the magnetic tape head of a cartridge-type tape player capable of playing different kinds of multi-track tape cartridges, each including coded portions to indicate the number of tracks therein, and having a selector integral with the tape player and being responsive to the coded portion of a cartridge placed in the player to indicate the number of tracks on the tape so that the tape head is automatically positioned in accordance with the number of tracks in the cartridge.

Another feature of this invention is a system for automatically positioning the magnetic tape head of a cartridge-type tape player capable of playing different kinds of multi-track tape cartridges, including a cam having first and second cam portions and slidably mounted on a shaft between first and second positions. The magnetic tape head is positioned by a cam follower which engages the first cam portion in the first cam position on the shaft and the second cam portion in the second cam position on the shaft. The cam is biased into the first position by a spring, and the selector is responsive to the coded portions on the cartridges to leave the cam in the first position for positioning the sound head to play one kind of cartridge, and for sliding the cam through a linkage against the spring bias along the shaft to the second position for positioning the sound head to play another kind of cartridge.

Still another feature of this invention is a system for automatically positioning the magnetic tape head of a cartridge-type tape player that is adapted to receive and play multi-track tape cartridges, including a ratchet wheel mounted on the shaft supporting the cam, and each cam portion of the cam having different cam surfaces associated with the different tracks on the tape. A solenoid has the extended end of the core or plunger thereof supported by a mounting to which is resiliently attached a pawl which is spring biased into contact with the ratchet wheel. At the end of one tape track, the solenoid is energized to move the core and support against the spring bias to disengage the pawl from the ratchet wheel, and is then de-energized so that the pawl is again biased into engagement with the ratchet wheel and advances it, thereby turning the shaft to rotate the cam so that another cam surface is engaging the cam follower for automatically positioning the tape head to play a different track of the multi-track tape.

In accordance with this invention, a stereophonic cartridge-type tape player adapted to receive and play four and eight track cartridges is combined with a radio receiver for installation in an automobile. The four track cartridge for use with the tape player has shaped radial corners at its leading edge, and the eight track cartridge has angular corners at its leading edge. A selector arm extends from a bell crank, pivotally mounted on the tape deck, into the cartridge receiving area of the player. The bell crank is connected to a dual rotary cam that is slidably mounted between two positions on the shaft. The dual cam has a first portion that has cam surfaces for positioning the magnetic tape head to play the eight track cartridge, and a second portion that has cam surfaces for positioning the magnetic tape head to play the four track cartridge. A cam follower selectively contacts the cam surfaces and extends to the sound head to position the same. In the first position, the cam follower contacts the first cam portion and in the second position, the second cam portion. A spring biases the bell crank to locate the cam in the first cam position. When an eight track cartridge is inserted into the tape player, the angular corners are such that the cartridge does not engage the selector arm, and the spring acts to bias the bell crank to locate the cam in the first position. However, when a four track cartridge is inserted into the player, the radial corners on the leading edge of the cartridge strike the selector arm which responds to move the bell crank against the spring bias to position the cam in the second cam position on the shaft.

A solenoid mounted on the tape deck is actuated at the end of the playing of two tracks for stereophonic reproduction to rotate the cam to position another cam surface in contact with the cam follower for the playing of the next two tracks on the tape. The solenoid accomplishes this by having the extended end of its core or plunger supported in a bracket which is slidably engaged with the shaft supporting the dual cam. A pawl is resiliently mounted to the bracket and is spring biased into engagement with a ratchet wheel mounted to the same shaft as the cam. When the solenoid is actuated at the end of the tape track, the core is attracted into the coil against the spring bias to disengage the pawl from the ratchet wheel. When the solenoid is deenergized, the spring biases the pawl back into contact with the ratchet wheel to advance the wheel and shaft, and hence the cam attached thereto.

Figure 1:
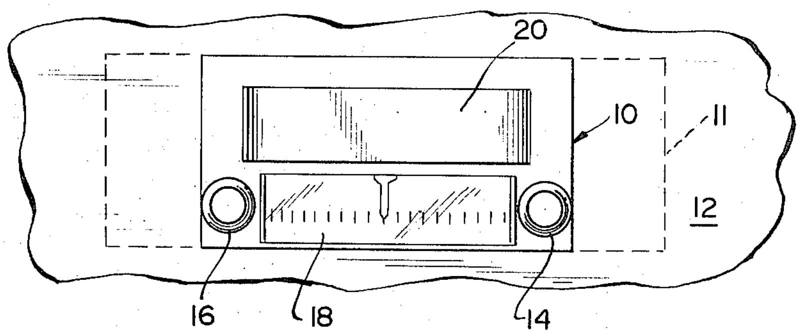
FIG. 1 is a front elevation of the combined radio and tape player of this invention for mounting in an automobile.

A better understanding of one embodiment of the invention may be had by referring to the drawings. FIG. 1 shows a stereophonic radio and cartridge tape player combination 10 having a single chassis 11 and mounted in the dashboard 12 of an automobile. The radio has an RF amplifier section 15 and an audio amplifier section 13 (FIG. 2) and is tuned by knob 14. The off-on control and volume for both the radio and tape player is controlled by knob 16. The radio has a dial 18 for indicating the station tuned by knob 14. A pivoted panel 20 provides access for the tape cartridges to be inserted into the cartridge receiving area of the tape player.

Figure 2:
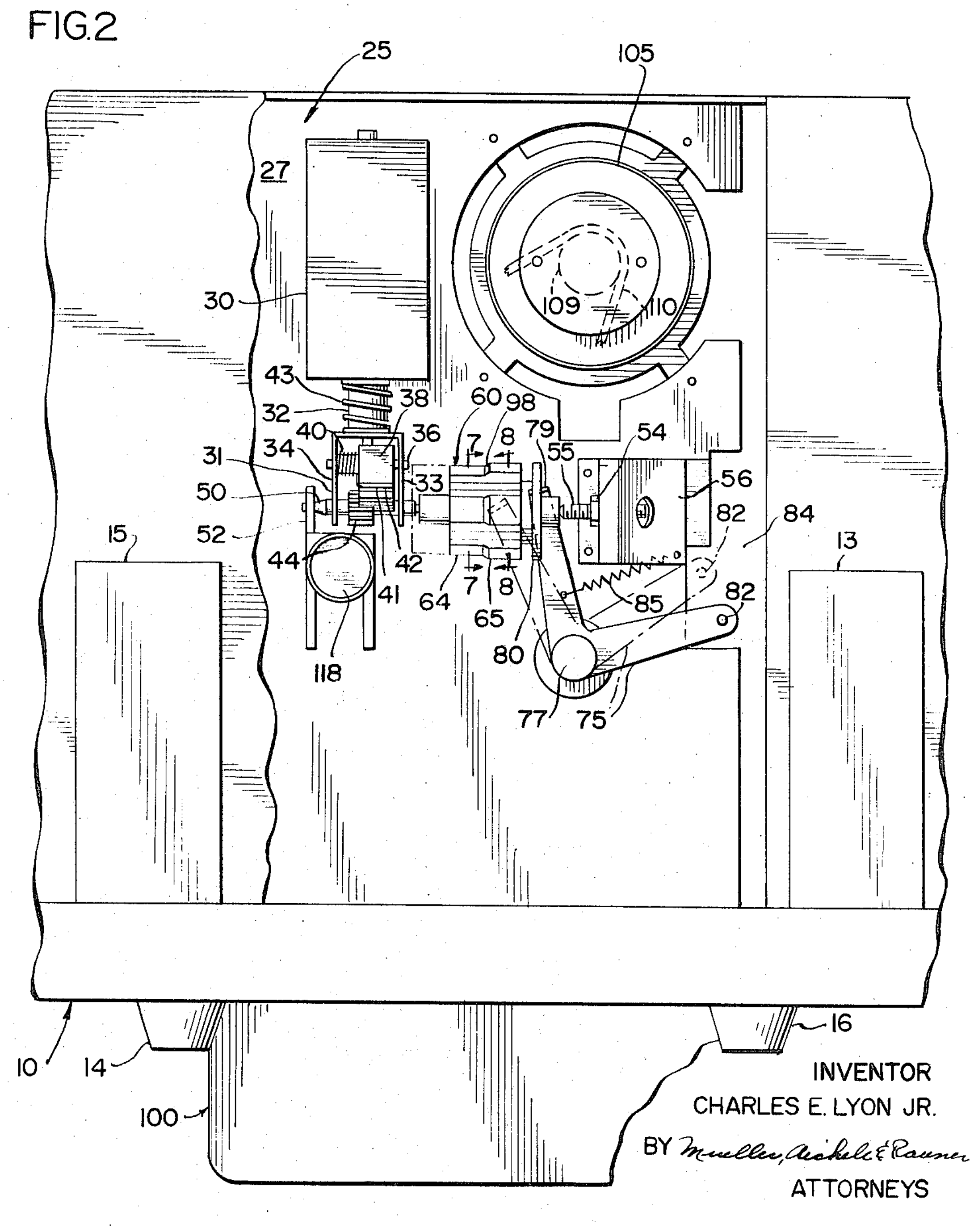
FIG. 2 is a plan view of the bottom of the radio tape player combination with a portion cut away to expose the tape deck.
Figure 3:
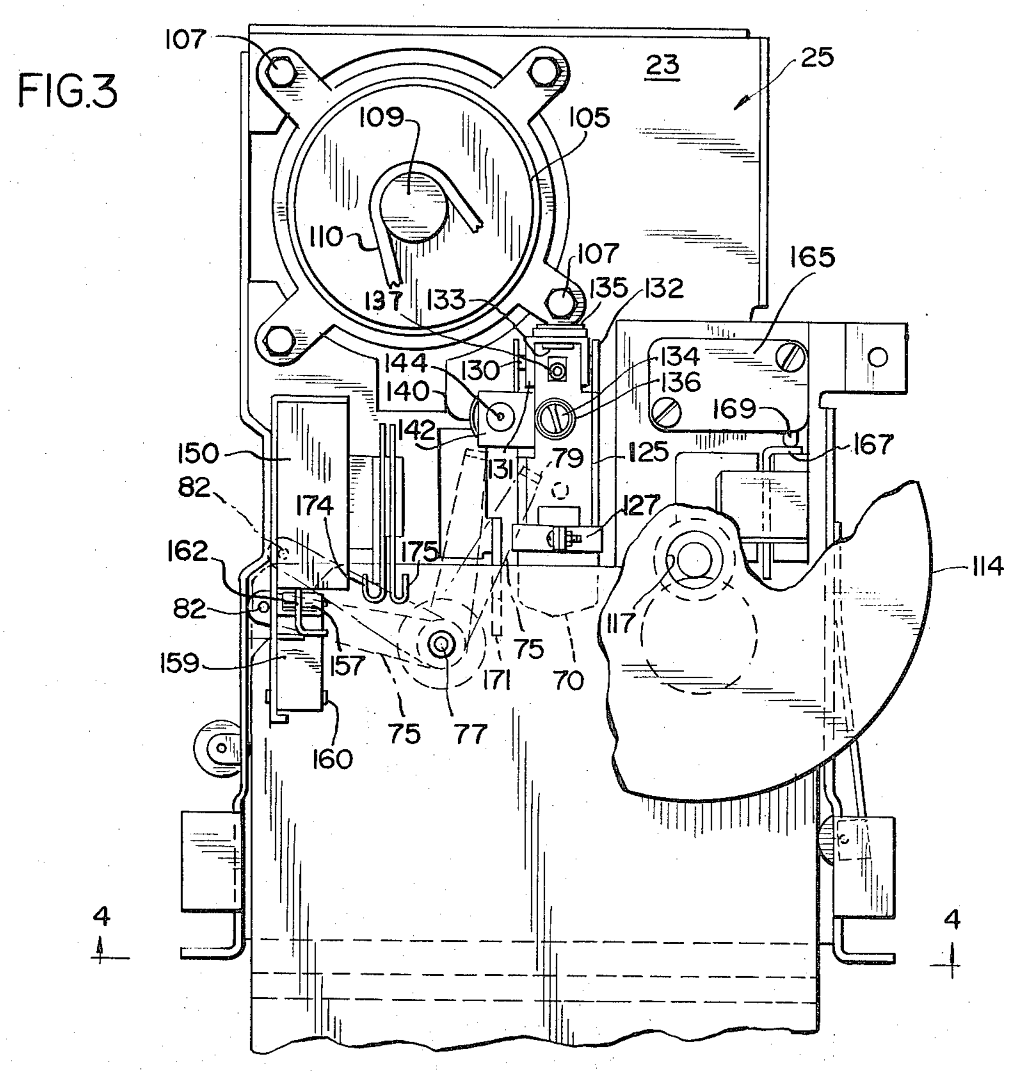
FIG. 3 is a plan view of the top of the tape deck with the tape cartridge in place.
Figure 4:
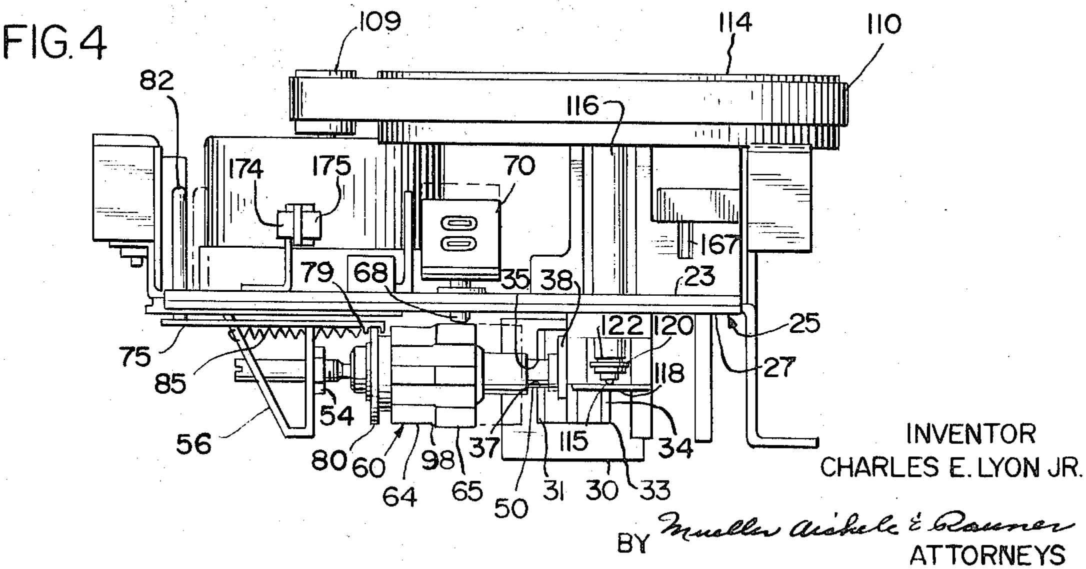
FIG. 4 is a front elevation of a section of the tape deck taken along line 4—4 of FIG. 3.
Figures 5, 6:
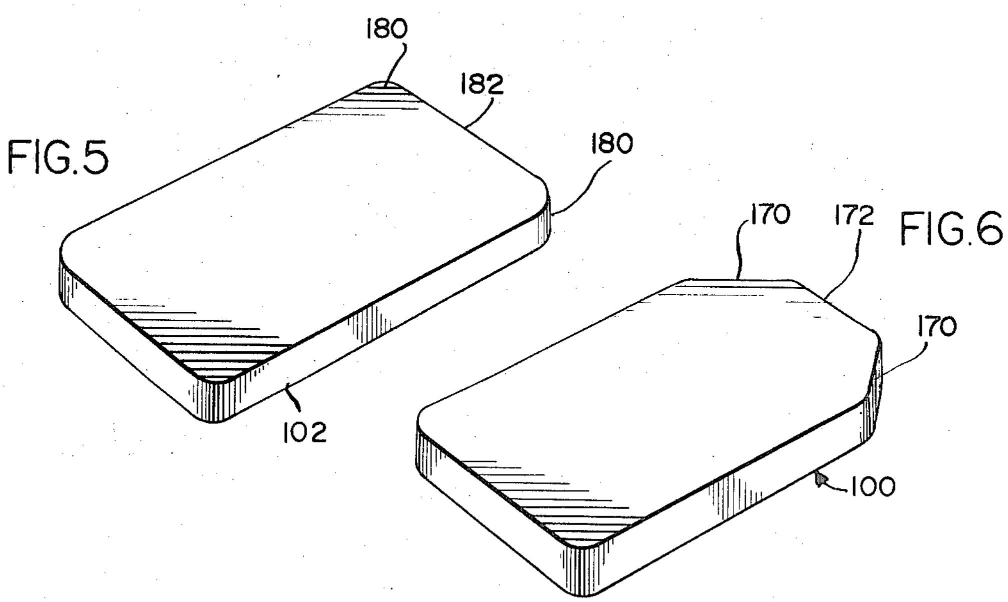
FIG. 5 is a perspective view of a four track tape cartridge.
FIG. 6 is a perspective view of an eight track tape cartridge.

FIGS. 2–4 show the tape deck 25 of the tape player in greater detail. Mounted to the bottom 27 (FIG. 2) of the tape deck 25 is a solenoid 30. The extended end or plunger 32 of the core of solenoid 30 is connected to a support bracket 34. A pin 36 extends between the walls of the bracket 34 and pivotally supports the pawl 38. The end 41 of spring 40, which is supported by pin 36, is received in groove 42 of the pawl 38. The spring serves to resiliently bias the pawl 38 onto the surface of the teeth of ratchet wheel 44. The bottom portion (not shown) of the pawl 38 engages the teeth of the ratchet wheel 44 in the known manner to prevent the force of the spring 40 acting through the pawl 38 from turning the ratchet wheel 44. A spring 43 encircles the extended portion 32 of the solenoid 30 and biases the bracket 34, hence pawl 38, into engagement with ratchet wheel 44. A shaft 50 is rotatably supported by mounting 52 on one end. A threaded cupped set screw 55 bears against a ball bearing (not shown) at the opposite end of the shaft 50 and is tightened against bracket 56 by nut 54 to hold the shaft in position. The ratchet wheel 44 is secured to the shaft 50 in such a manner that rotation of the wheel 44 will cause rotation of the shaft 50. The bracket 34 has slots in its walls 31 and 33 extending to the end of the bracket so that it can be slidably supported by the shaft 50. Even with the plunger 32 of the solenoid 30 drawn into the coil thereof the walls 35 and 37 (FIG. 4) of the slots slide on the shaft 50 and the bracket 34 is still supported thereon.

Figures 7, 8, 9:
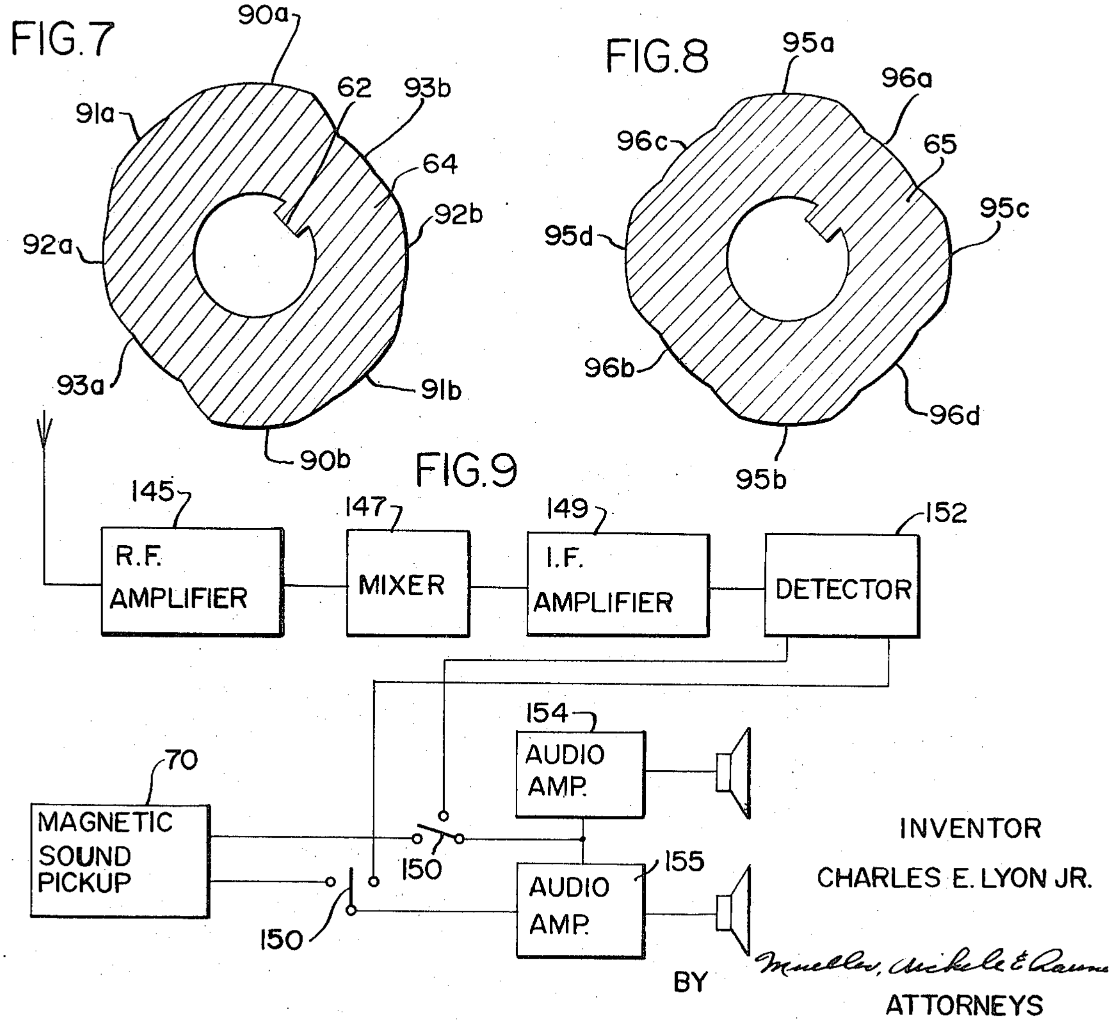
FIG. 7 is an expanded cross-section taken along line 7—7 of FIG. 2.
FIG. 8 is an expanded cross-section taken along line 8—8 of FIG. 2.
FIG. 9 is a block diagram of the radio and tape player of this invention.

A substantially cylindrical shaped dual cam 60 is also mounted coaxially to the shaft 50 by a key on the shaft 50 that engages the keyway 62 (FIG. 7). Therefore, not only does the cam 60 rotate with the shaft 50 in the same manner as ratchet wheel 44, but it also is free to slide thereon. The cam 60 has a first cam portion 64 associated with an eight track cartridge and a second cam portion 65 associated with a four track cartridge. A cam follower 68 (FIG. 4) rides on the cam surfaces of the first and second cam portions 64 and 65. The cam follower 68 also passes through the tape deck 25 to engage the magnetic tape head 70 and acts to position that member as will be described subsequently.

A bellcrank 75 is pivoted to the tape deck 25 at 77 and has a pawl 79 at one end that grips a disc-shaped member 80 that is integral with the cam 60. A selector arm 82 (FIG. 4) is connected to the other end of the bellcrank 75 and extends through opening 84 in the tape deck 25 into the area where the cartridge is received in the tape player. The beltcrank 75 functions to locate the dual cam 60 in one of two positions on the shaft. A spring 85 biases the crank into the position shown by the solid line in FIG. 2, thereby sliding the dual cam 60 into a first position on the shaft 50 so that the first cam portion 64 contacts the cam follower 68. The bellcrank 75 can also be moved against the tension of spring 85, in a manner to be described subsequently, to slide the dual cam 60 into a second position on the shaft 50, indicated by the dotted and dashed line of FIG. 2, so that cam follower 68 contacts the second portion 65 of dual cam 60.

Each of the cam portions of the cylindrical shaped cam 60 has a plurality of cam surfaces on the periphery thereof on which the cam follower 68 rides. Because this particular embodiment of the invention is being described as a stereophonic cartridge-type tape player, two tracks on the tape will be played simultaneously to provide stereophonic reproduction. Therefore, in order to properly position the tape head 70 for use with the eight track cartridge 100, for instance, four different cam surfaces would be required. FIG. 7 shows the cam surfaces for use with the eight track cartridge 100. They are 90*a* and 90*b* 91*a* and 91*b*, 92*a* and 92*b*, and 93*a* and 93*b*. Identical surfaces such as 90*a* and 90*b* are provided so that wherever the cam 60 is positioned by the pawl 38 when the eight track cartridge 100 has been placed in the tape player, the cam follower 68 will contact an operable cam surface to position the magnetic tape head 70 to play two tracks of the tape simultaneously. In addition, by having like pairs of cam surfaces the motion required to rotate the cam between tracks is limited. FIG. 8 shows the cam surfaces for use with a four track tape cartridge 102. They are 95*a*, *b*, *c* and *d*, and 96*a*, *b*, *c*, and *d*. In this instance, four identical surfaces are provided such as 96*a*, *b*, *c* and d to insure that the cam follower 68 will always be in contact with an operable cam surface regardless of the rotation of the cam i.e., so that tape head 70 will always be positioned properly to play the tape and to limit the rotation to play the next two tracks. Between the two cam portions 64 and 65, is a transition or slide surface 98 which is a smooth surface between the cam portions. This transition 98 permits the cam 60 to slide along the shaft 50, between the two cam positions on the shaft 50 in any rotary position of the cam, without the cam follower 68 becoming jammed as it moves, for instance, from contact with one cam surface on cam portion 65, into contact with another cam surface on the other cam portion 64.

The details of the top 23 of the tape deck 25 can best be seen in FIG. 3. An electric motor 105 is secured to deck 25 by fasteners 107. A pulley 109 is driven by the motor 105. A belt 110 connects the pulley 109 to the flywheel 114 for advancing the tape in the cartridge. The flywheel 114 is rotatably supported by an integral capstan shaft 116 (FIG. 4) which extends through a cylindrical opening 117 in the deck 25 and has a thrust bearing 115 at the end thereof that butts against plate 118. The capstan shaft 116 is secured against axial movement by pin 120 which fits in the annular groove 122.

The magnetic tape head 70 is positioned on the tape deck 25 so that it can be adjusted both in azimuth and in altitude, in order to align it properly with the channels on the tape. To accomplish this, the head 70 is clamped to head bracket 125 by adjustable clamp 127. The head bracket 125 is then pivotally mounted to U-shaped azimuth bracket 131 by pivot pin 133. The pivot pin 133 is secured against linear movement by a spring washer 135. The U-shaped bracket 131 in turn is pivoted about axis 130 that extends between a support bracket 132 which has a resilient base which is fixedly mounted at its front edge, that is, the edge closest to the head 70, to the tape deck 25. A screw 137 passes through the resilient base of the support bracket 132 and the tape deck 25. Moving the screw 137 in one direction, causes the support bracket 132 to be positioned relative to the tape deck 25 to raise the sound head 70 in elevation, while movement of the screw in the opposite direction positions the bracket 132 to lower the sound head. A screw 134 is threaded through the head bracket 125 and the tape deck 24. A spring 136 encircles the screw 134 and is compressed between the screwhead and the head bracket 125. The spring 136 serves to bias the sound head 70 against the cam follower 68. A second spring 140 is compressed between plate 142, which is integral with U-shaped bracket 131, and a plate (not shown) that is integral with the head bracket 125. A threaded screw 144 extends between the plates. By adjusting this screw, the tension on spring 140 can be varied to cause the head bracket 125 to pivot around pivot pin 133 to provide a fine adustment in azimuth for the tape head 70. The head 70 is supported from underneath by the cam follower 68 and moves up and down with it depending on the particular cam surface with which the follower is in contact thereby aligning the tape head 70 with the tape tracks associated with that particular cam surface.

Two switches are also located on the top 23 of the tape deck 25, and both are operated by the tape cartridge when it is inserted into the tape player. Switch 150 is used to decouple the right and left stereo signals from the detector 152 of the radio shown in FIG. 9 to the stereo audio amplifiers 154 and 155. In addition to the detector 152, the radio includes an RF amplifier 145, a mixer 147, and an IF amplifier 149. The switch 150 then couples the right and left stereo signals from the magnetic tape head 70 to the audio amplifiers 154 and 155. The switch is actuated by the tape cartridge being inserted in the player and striking a roller 157. The roller is connected to arm 159 which pivots about axes 160. As the arm 159 pivots, it engages the plunger 162 and moves it into the switch 150 to cause the switching action.

The second switch 165 operates to energize the circuits of the tape player including the motor 105. This switch 165 is actuated by the leading edge of the tape cartridge contacting the plunger 167 and moving it against the actuating plunger 169 of the switch 165. Both arm 159 and plunger 167 are spring biased so that upon removal of the cartridge from the tape player, the player circuits are de-energized, and the stereo signals from the radio detector 152 are once again coupled to the audio amplifiers 154 and 155.

Actual operation of the device is straight forward and relatively simple. For explanation purposes, the eight track cartridge 100 will be considered first. The cartridge 100 has angled corners 170 on its leading edge 172. When the cartridge 100 is inserted into the tape player, an alignment member 171 engages the tape cartridge 100 to expedite aligning the tape and cartridge within the player. The tape head 70 enters an aperture in the tape cartridge and rests against the tape. The contacts 174 and 175 pass through an aperture in the tape cartridge 100 and also contact the tape. The switches 150 and 165 are also actuated by the placing of the cartridge 100 into the player as subsequently described.

Because the corners 170 of the cartridge 100 are angled, the cartridge 100 does not strike the selector arm 82 as indicated in FIG. 3. Therefore, the spring 85 biases the bell crank 75 in a position shown in solid lines in FIG. 2. The bell crank thus positions the cam 60 in the first position on the shaft 50. This positions one of the cam surfaces, for instance 90a of the first cam portion 65 into contact with the cam follower 68. The cam follower 68 acts to locate the tape head 70 in height to play the two tracks of the stereo tape associated with the cam surface 90*a*. When the tape has been completed, an aluminum strip that completes the loop of the tape passes across the two contacts 174 and 175 thereby completing the circuit to the solenoid 30 and energizing the same. The solenoid 30 then operates the pawl 38 in the manner heretofore described to rotate the cam 60 to position another cam surface, for instance 91*a* in contact with the cam follower 68. The cam follower 68 then reacts to reposition the tape head for playing the next two stereo tracks.

When the four track cartridge 102 is inserted into the tape player, a different series of events occur. The corners 180 of the leading edge 182, of the cartridge 102 are radially shaped. Therefore, when the cartridge 102 is inserted into the player, the corners 180 contact the selector arm 82 and move it into the position shown in dotted and dashed lines in FIG. 4. Movement of the arm 82 is transferred to the bellcrank 72 to move cam 60 into the position shown in dotted and dashed lines in FIGS. 2 and 4. This position of the cam 60 corresponds to the second cam position on the shaft 50. The cam follower 68 is now in contact with a cam surface, for instance, 95*a* of the second portion 65 of the cam 60. This positions the tape head 70 in the manner described to play the two tracks associated with cam surface 95*a*. When the tape is finished, the solenoid is actuated in the manner previously describe to position the tape head 70 for the next two tracks of the tape.

What has been described, therefore, is a system for automatically positioning the magnetic tape head of a cartridge type tape player that is adapted to receive and play multi-track tape cartridges of different kinds which have different numbers of tape tracks therein. The versatile tape player is relatively simple and inexpensive to manufacture yet is compact and rugged enough to be used in combination with a radio for installation into automobiles.

I claim:

1. A system for automatically positioning the magnetic tape head of a cartridge type tape player that is adapted to receive and play multi-track tape cartridges of different kinds which have different numbers of tape tracks therein, said system including in combination, a tape deck, first and second tape cartridges each having different shaped portions thereon for indicating the number of tape tracks therein, selector means integral with the tape player and being responsive to the shaped portions, a shaft mounted on said tape deck and having a cam slidably mounted thereon, said cam having first and second cam portions and first and second positions on the shaft, a cam follower engaging said first cam portion with said cam in said first position on said shaft and said second cam portion with said cam in said second position on said shaft, said cam follower being connected to the tape head for positioning the same, bias means resiliently biasing said cam in said first position on said shaft, and linking means connecting said selector means to said cam for sliding the same to said second position on said shaft against said bias means, said selector means being responsive to said shaped portion of said first tape cartridge when received in the tape recorder to move said bias means to hold said cam in said first position, and said selector means being responsive to said shaped portion of said second cartridge to slide said cam to said second position on said shaft, whereby said cam follower cooperates with said first and second cam portions to automatically position the magnetic tape head in accordance wtih the number of tracks in said first and second cartridges.

2. A cartridge-type tape player for playing first and second kinds of cartridges having magnetic tape therein, the first kind of cartridge having magnetic tape therein with a first predetermined number of groups of recorded tracks thereon, the second kind of cartridge having magnetic tape therein with a second predetermined number of groups of recorded tracks thereon, said first predetermined number of said groups being different than said second predetermined number of said groups, each of said first and second kinds of cartridges carrying identifying characteristic means representing respectively said first and second predetermined number of groups of tracks recorded on the tape therein, said tape player further including means for receiving each of said first and second kinds of cartridges, a magnetic tape head moveable between a plurality of transverse positions relative to said tape in the cartridge positioned in the player, said magnetic tape head including at least two magnetic transducer portions which must be registered to respective recorded tracks in each group of recorded tracks in each kind of cartridge in a manner to cause playback of said recorded tracks in each said group, cartridge sensing means on the tape player for sensing said identifying characteristic means of each kind of cartridge with the same being inserted into the tape player, means responsive to said cartridge sensing means for registering said at least two magnetic transducer portions to respective recorded tracks of one of the groups of recorded tracks on said tape in a manner to cause playback of the same, and means for moving said magnetic tape head between said transverse positions relative to said tape to cause playback of all said groups of recorded tracks on said tape in said cartridge so inserted into said player.

3. The cartridge-type tape player of claim 2 wherein said first kind of cartridge includes four groups of recorded tracks and said second kind of cartridge includes two group of recorded tracks.

4. The cartridge-type tape player of claim 3 wherein with said means responsive to said cartridge sensing means registering said at least two magnetic transducer portions to respective recorded tracks of one of the groups, said player plays back the tracks of said one of said groups, said player further including actuating means responsive to the completion of the playing back of the tracks of said one of said groups to actuate said means for moving said magnetic tape head which means moves said tape head to a different transverse position relative to said tape in said cartridge to cause playback of a group of recorded tracks different than said one of said groups.

5. The cartridge-type tape player of claim 4 wherein said actuating means is operated three times to move said magnetic tape head between different transverse positions subsequent to the playback of said one of said groups to cause the playback of all the groups on the magnetic tape in said first kind of cartridge and said actuating means is operable one time to move said magnetic tape head between different transverse positions subsequent to the playback of said one of said groups to cause the playback of all the groups on the magnetic tape in said second kind of cartridge.

6. A system for automatically positioning the magnetic tape head of a cartridge-type tape player that is adapted to receive and play multi-track tape cartridges of different kinds which have tapes with different numbers of tracks recorded thereon, with the tape cartridges having coded means for identifying the number of tracks, said system including in combination, selector means responsive to the coded means on the tape cartridges, cam means including a plurality of cam portions each associated with one kind of cartridge, a cam follower in engagement with said cam means and connected to the tape head for positioning the same to cooperate with the tracks of a cartridge, and linking means connecting said selector means to said cam means, said selector means operating in response to placement of a tape cartridge in the tape player to determine the number of tracks in the cartridge and actuating said linking means in accordance therewith to position said cam means relative to said cam follower to render a predetermined cam portion operative, said cam follower cooperating with the operative cam portion to automatically position the magnetic tape head in accordance with the number of tracks of such cartridge.

7. Radio receiving and tape playing apparatus including in combination, a single supporting chassis, radio receiving means on said chassis for producing audio signals, stereophonic cartridge-type tape playing means for receiving multi-track tape cartridges of different kinds which have therein tapes with different numbers of tracks recorded thereon, with each tape cartridge having means for identifying the number of tape tracks therein, said playing means including a magnetic head for deriving audio signals from the recorded tracks, audio amplifier means, electrical switch means, said switch means responding to the placement of a tape cartridge in the tape player for selectively connecting audio signals from the radio receiving means and from the tape playing means to said audio amplifier means, selector means responsive to the cartridge identifying means of a cartridge in the tape player, cam means including cam portions associated with the tracks of the different kinds of cartridges and a cam follower connected to the tape head for positioning the same, and linking means connecting said selector means to said cam means, said selector means operating in response to placement of a tape cartridge in the tape player to determine the number of tracks in the cartridge and actuating said linking means in accordance therewith, said linking means acting to position said cam means relative to said cam follower to render a predetermined cam portion operative, said cam follower cooperating with the operative cam portions to automatically position the magnetic tape head in accordance with the number of tracks of the cartridge in the player.

8. A system for automatically positioning the magnetic tape head of a cartridge-type tape player that is adapted to receive and play multi-track tape cartridges of different kinds which have tapes with different numbers of tracks recorded thereon, and with the tape cartridge having shaped portions for identifying the number of tape tracks therein, said system including in combination, selector means integral with the tape player and being responsive to the kind of cartridge, cam means including cam portions associated with different kinds of cartridges, each of said cam portions having a plurality of cam surfaces thereon, a cam follower selectively contacting one of said cam surfaces on one of said cam portions and being connected to the tape head for positioning the same, and linking means connecting said selector means to said cam means, said selector means operating in response to placement of a tape cartridge in the tape player to determine the number of tracks in the cartridge and actuating said linking means in accordance therewith, said linking means acting to position one of said cam portions of said cam means so that said cam follower contacts one of said cam surfaces thereof to automatically position the magnetic tape head in accordance with the number of tracks in the cartridge.

9. A system for automatically positioning the magnetic tape head of a cartridge-type tape player that is adapted to receive and play multi-track tape cartridges of different kinds which have tapes with different numbers of tracks recorded therein, said system including in combination, shaped portions integral with the tape cartridge for identifying the number of tape tracks therein, selector means integral with the tape player and being responsive to the shaped portions, a horizontally disposed shaft integral with the tape player and having a substantially cylindrical shaped cam coaxially mounted thereon, said cam including cam portions associated with the different kinds of cartridges, each said cam portion having a plurality of circumferentially disposed cam surfaces around the periphery of said cylindrical cam, a cam follower selectively contacting one of said cam surfaces on one of said cam portions and being connected to the tape head for positioning the same, and linking means connecting said selector means to said cam, said selector means operating in response to placement of a tape cartridge in the tape player to determine the number of tracks in the cartridge and actuating said linking means in accordance therewith, said linking means acting to position one of said cam portions of said cam so that said cam follower contacts one of said cam surfaces thereof to automatically position the magnetic tape head in accordance with the number of tracks in the cartridge.

10. Radio receiving and tape playing apparatus including in combination, a single supporting chassis, radio receiving means on said chassis for producing audio signals, stereophonic cartridge-type tape playing means for receiving multi-track tape cartridges of different kinds which have therein tapes with different numbers of pairs of stereo tracks recorded thereon, with each tape cartridge having means for identifying the number of tape tracks therein, said playing means including a magnetic head for deriving audio signals from the recorded pairs of stereo tracks, audio amplifier means, electrical switch means, said switch means responding to the placement of the tape cartridge in the tape player for selectively connecting audio signals from the radio receiving means and from the tape playing means to said audio signal amplifier means, selector means responsive to the cartridge identifying means of a cartridge in the tape player, a shaft having a substantially cylindrical cam coaxially and slidably mounted thereon, said cam including first and second cam portions, each cam portion having a plurality of different cam surfaces around the periphery thereof, each different cam surface being associated with a pair of stereo tape tracks, a cam follower selectively contacting one of the cam surfaces and being connected to the tape head for positioning the same, linking means connecting said selector means to said cam, said selector means operating in response to placement of the tape cartridge in the tape player to determine the number of tracks in the cartridge and actuating said linking means in accordance therewith, said linking means acting to position said cam on said shaft to position one of said cam portions of said cam so that said cam follower contacts one of said surfaces thereof to automatically position the magnetic head in accordance with the number of tracks in the cartridge, actuating means connected to said shaft for rotating the same upon the completion of playing of one of the different pairs of stereo tracks on the tape, thereby positioning a different cam surface into contact with said cam follower to automatically position the magnetic tape head to play a different pair of tracks of the multi-track tape.

11. A head shift mechanism in a tape recorder or playback machine for handling magnetic tapes having different numbers of recording tracks, comprising:

a record or playback head;

means supporting said head for vertical movement above a top deck of said machine;

cam means including at least two sets of cams and a support shaft for carrying said sets of cams;

cam follower means connected to said head for engaging one or the other of said sets of cams to raise and lower said head between two pluralities of different vertical positions with a turning of said shaft;

selectively operable means for shifting said cam follower means relative to said cam means to engage one or the other of said sets of cams;

and selectively operable means for turning said shaft between a plurality of preselected positions.

12. The mechanism of claim 11 including means supporting said shaft against axial movement.

13. The mechanism of claim 11 wherein said sets of cams are separate rings and said shaft is coaxial with said rings of cams.

14. A cartridge-type tape player system for playing cartridges with magnetic tape therein having a number of recording tracks, comprising: a magnetic head being movable between a plurality of transverse positions, said head having at least two magnetic transducer portions formed thereon to be in registry with a corresponding group of recording tracks formed on a tape within a given cartridge which is inserted into the tape player, said tape having a plurality of such groups of recording tracks, each of which requires alignment of said magnetic transducer portions, and the number of such groups of recording tracks being indicated by identifying characteristic means formed on the given cartridge;

sensing means on the tape player for sensing the identification characteristic means on the cartridge inserted therein; and means responsive to said sensing means for adjusting said magnetic head to a predetermined one of said transverse positions for aligning said magnetic transducer portions to a predetermined group of recording tracks in response to the identification characteristic means of the given cartridge inserted into the tape player to cause playback of the recording tracks in registry with said at least two magnetic transducer portions.

15. The cartridge-type tape player of claim 14 wherein said sensing means includes a lever which is actuated by a housing portion which forms said identifying characteristic means on one type of cartridge, and which lever is not actuated as a result of the absence of said housing portion which forms said identification characteristic means on another type of cartridge.

16. In a cartridge tape recorder having a head, a capstan and a plate on which are mounted cartridge guides, a head supporting pin, a cam shaft slidably positioned under said pin, a plurality of cams fixedly mounted on said cam shaft, a spring coupled to said cam shaft tending to slide said cam shaft in one direction, a pivotally mounted lever engaging one end of said cam shaft and means operable by the insertion of the cartridge on said plate for pivoting said lever and sliding said cam shaft against said spring whereby one of said cams support said pin and changes the position of said head relative to the tape.

17. The cartridge-type tape player system of claim 16 wherein said means responsive to said sensing means for adjusting said magnetic head includes a cam operable to move the head between said groups of recording tracks on the tape.

* * * * *